United States Patent [19]

Marx

[11] Patent Number: 4,974,168

[45] Date of Patent: Nov. 27, 1990

[54] AUTOMATIC PIPELINE DATA COLLECTION AND DISPLAY SYSTEM

[75] Inventor: Gregory C. Marx, St. Louis Park, Minn.

[73] Assignee: Cherne Industries, Inc., Minneapolis, Minn.

[21] Appl. No.: 183,709

[22] Filed: Apr. 19, 1988

[51] Int. Cl.$^5$ ................. H04N 7/18; G01N 21/88
[52] U.S. Cl. .................. 364/506; 364/507; 364/550; 358/100; 358/106; 356/241; 73/622; 73/618
[58] Field of Search ............... 364/505–507, 364/550, 551.01; 358/199, 100, 106–108; 356/241; 73/620, 622, 623, 618, 619; 324/219–221

[56] References Cited

U.S. PATENT DOCUMENTS

| | | | |
|---|---|---|---|
| 3,832,724 | 8/1974 | Duval | 354/63 |
| 3,958,080 | 5/1976 | Schadler | 178/7.91 |
| 4,246,604 | 1/1981 | Hundermark et al. | 358/100 |
| 4,255,762 | 3/1981 | Takeyasu et al. | 358/100 |
| 4,317,632 | 3/1982 | Orphan et al. | 356/241 |
| 4,424,531 | 1/1984 | Elter et al. | 358/100 |
| 4,550,376 | 10/1985 | Maciejczak | 364/506 |
| 4,560,931 | 12/1985 | Murakami et al. | 73/723 |
| 4,677,472 | 6/1987 | Wood | 358/100 |
| 4,691,728 | 9/1987 | Mathison | 137/15 |
| 4,712,182 | 12/1987 | Wakamori et al. | 364/507 |
| 4,725,883 | 2/1988 | Clark, Jr. et al. | 356/241 |

Primary Examiner—Parshotam S. Lall
Assistant Examiner—Brian M. Mattson
Attorney, Agent, or Firm—Anthony G. Eggink

[57] ABSTRACT

An automatic, electronically operated data collection and display system for a pipeline video monitoring device, and a method for collecting and displaying information on a pipeline with a video image. A plurality of data inputs are connected to the monitoring device for receiving information on the operating parameters of the device. The data inputs include an operator input. A control unit is connected to the data inputs and has an interconnected central processor, input/output control system, and graphics generation and video overlay system. Data outputs are connected to the input/output control.

20 Claims, 11 Drawing Sheets

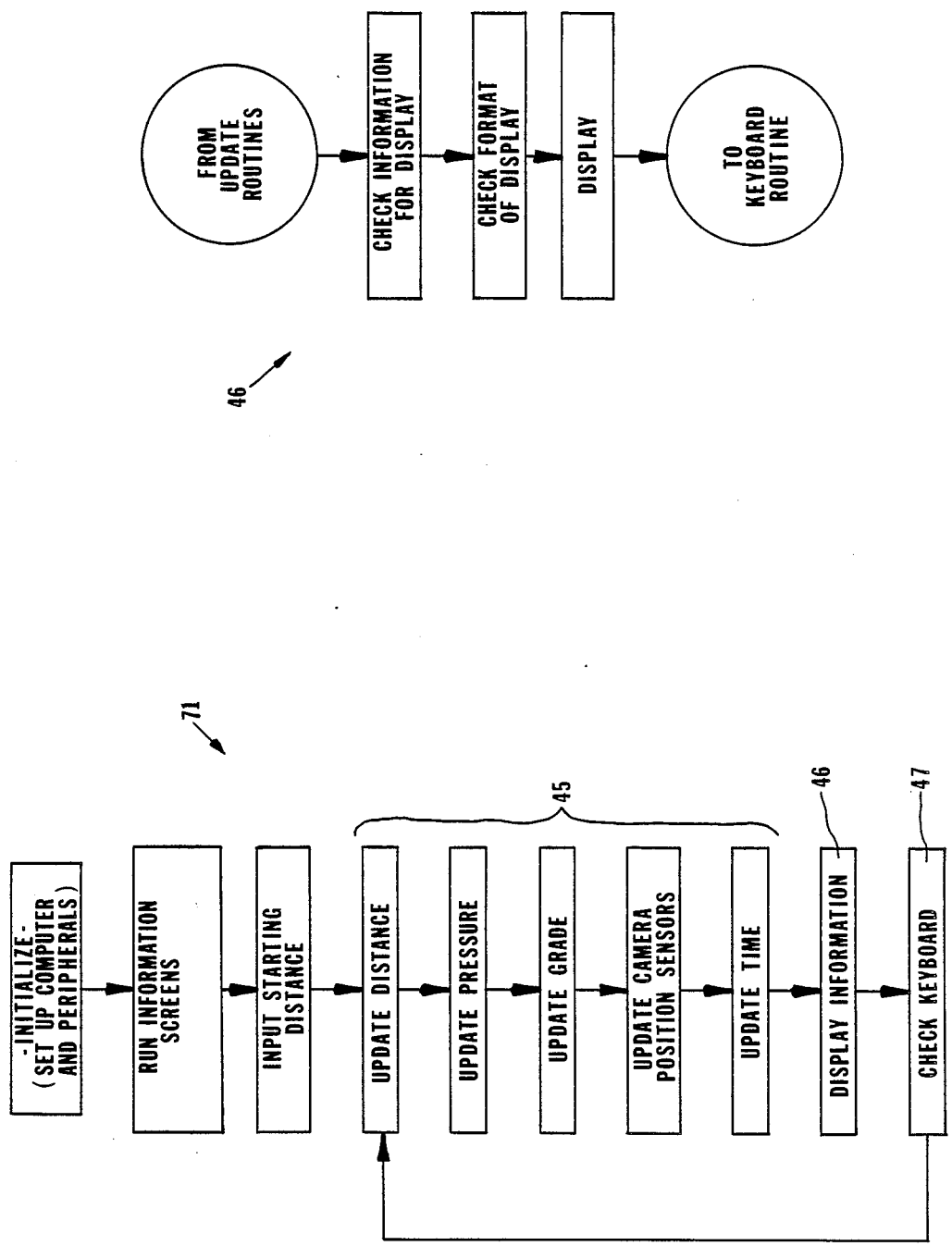

```
                NAME OR TITLE
                   STREET
              CITY, STATE, ZIP CODE
                 PHONE NUMBER
                                                    ,94

DATE:
       CUSTOMER:
       LOCATION:
       OPERATOR:
      INSPECTOR:
    STREET NAME:
      PIPE SIZE:
      PIPE TYPE:
     JOINT TYPE:
UPSTREAM MANHOLE
         NUMBER:
      CONDITION:
DOWNSTREAM MANHOLE
         NUMBER:
      CONDITION:
MEASUREMENT
           FROM:
             TO:

DISTANCE   PRESSURE    TIME       DEFECT AND REMARKS
 0000.0     00.0      0:00:00
```

FIG. 9

AUTOMATIC PIPELINE DATA COLLECTION AND DISPLAY SYSTEM

BACKGROUND

This invention relates to information gathering and display systems and more particularly to video inspection devices and methods. These devices and methods are particularly useful for collecting video information and other data relating to pipeline systems and for the display and storage of such information.

It has become increasingly necessary and desirable in the pipeline construction and repair industry to inspect the interior of new pipeline constructions prior to use to determine its structural integrity and to periodically inspect existing pipelines to determine its condition.

The recording of this information provides contractors and municipalities with valuable information as to the condition as well as changed conditions over time of various enclosed conduit and pipeline systems.

Prior art video inspection systems have been subject to limitations and shortcomings, such as electrical and mechanical unreliability and the inability to monitor and display adequate data in color. Prior art devices are limited to display in a single video format. A longstanding need has existed in the video pipeline inspection industry for an improved, automatic and reliable device which provides versatility and ease of operation and which also provides for ease of operator input.

Despite the need for a monitoring device in the art which provides comprehensive pipeline data, which is automatic and which overcomes the limitations and problems of the prior art, none insofar as is known has been proposed or developed.

Accordingly, it is an object of the present invention to provide an automatic data collection system which displays both video and graphic information on a conduit system such as an underground pipeline. It is also an object of the invention to provide a system for collecting sensor data obtained from the pipeline through a mobile monitoring device, for information input from the user of the system, and for the recording of this information on video tape or hard copy for subsequent study and later reference. It is a further object of this invention to provide a system useable by contractors as well as municipalities to obtain information with respect to newly constructed pipelines and existing pipelines such as sewer lines.

SUMMARY

The device of the present invention is an improved data collection and video display system. The data collection and display system automatically collects pertinent survey data for display and recording in conjunction with a video image. The system provides for ease of input of information by an operator and for automatic input of physical information on the pipeline being surveyed. The system interprets information input from the operator and the sensors and formats a display with a video image.

The data input sources of the automatic data collection and display system include, but are not limited to a keyboard, a timer, an odometer, a pressure transducer, an inclinometer, and a camera position sensor. The primary graphical data outputs of the system are survey distance, pipeline pressure, survey timing, and operator remarks. The survey distance, pressure and timing outputs are continuously and automatically updated and optionally displayed, while operator remarks are provided by the user and displayed as necessary.

The automatic, data collection and display system is usable in a pipeline for remote collection and display of information. The system comprises the data input sensors, the keyboard, a mobile video camera, a video monitor and a video recorder. The system also has a control unit constructed and arranged for correlating information from the data input sensors and keyboard with images from the video camera. The system provides increased stability of data storage, improved display of data without reduction in video image quality, and enhanced ability to monitor and display additional functions.

The control unit has processing means which control the collection and display of data, input/output control means, and means to overlay graphical data on a video image. The processing means has program means for updating information from the data input sensors, for displaying the updated information, and for correlating information from the keyboard therewith. The input/output control means interfaces the data input sensors, keyboard, video monitor, and video recorder with the processing means. The graphics generation and video overlay means has electronic means for generating graphics from signals produced by the data input sensors and keyboard. It also has electronic means for overlaying the graphics with signals from the video camera and/or related devices for display on the video monitor.

The program means comprises an update routine, a display routine, and a check-keyboard routine. The update routine converts signals output by the input/output control means from a computer information code format to an American Standard Code for Information Interchange (ASCII) format for display on the video monitor. The display routine determines which information is to be displayed and in what format they are to be displayed on the video monitor and then displays them. The check-keyboard routine comprises a preprogrammed menu of operator input remarks and a plurality of attribute display functions. The check-keyboard routine determines whether the pre-programmed menu is selected and if so, analyzes and displays the menu selection. If an attribute display function has been selected by the operator, the check-keyboard routine executes that function.

The automatic features of the system provide a device which requires minimal operator input. The operator need not undergo extensive manual record keeping during the pipeline inspection process. The system allows an engineer or other personnel to view at a later time the information collected by a field operator. Since most newly layed pipe must be preinspected prior to completion, the automatic data collection and display system may be used to make a record of this pre-inspection. If a problem arises later, a second record may be made which is then compared with the pre-inspection record to determine if the problem arose from a fault of the contractor or as a result of a naturally occurring phenomenon.

The system is portable and may be located in a mobile van or trailer. The system may be used in conjunction with apparatus for testing and/or repairing pipeline, for example, an inflatable packer device. The automatic data collection and display system may be used for pipes which range in diameter size from 6 inches to approximately 6 feet, the only lower limit limitation to the use of the equipment being dictated by the size of the video camera and/or related devices themselves.

The method of this invention first involves providing a continuous video image of the pipeline. Continuous data on the physical parameters of the pipeline is then detected and converted to a graphical format. The graphics are then overlayed on the video image. Finally, graphical information from an observer is provided and overlayed on the video image, whereby the data and the operator generated information are continuously updated on the video image.

These and other benefits of this invention will become clear from the following description by reference to the drawings.

BRIEF DESCRIPTION OF THE DRAWINGS

FIG. 5 is a schematic flow diagram which illustrates the process of data collection and display utilizing the apparatus of the invention;

FIG. 6 is a schematic flow diagram which illustrates the display routine process of the invention;

FIG. 9 is a diagram illustrating the hard copy output of the apparatus of this invention;

DESCRIPTION

Figure 1:
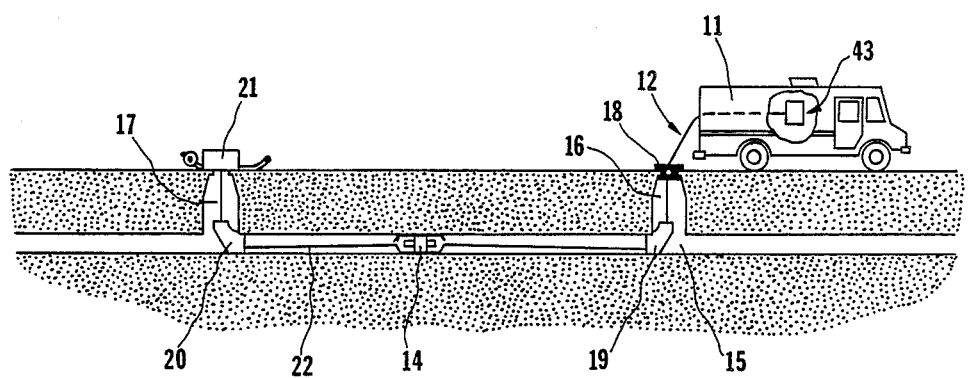
FIG. 1 is a plan view which shows the automatic data collection and display apparatus of this invention placed in a vehicle and connected to a pipeline monitoring device for survey purposes.

Referring to FIG. 1, a motorized vehicle or van 11 is shown at a site for surveying a pipeline 15. The van 11 carries the required surveying materials; it provides the required electrical power; and it houses the electronic data collection and display apparatus 43 for use with a pipeline monitoring device or camera sled assembly 14.

As is further shown in FIG. 1, a cable assembly 12 extends from the electronic survey apparatus 43 into a manhole entry 16. The winding and unwinding of the cable assembly 12 is facilitated by a surface roller assembly 18 and a manhole down roller assembly 19 located at the manhole entry 16 and by a manhole down roller assembly 20 and a windup winch assembly 21 located at an adjacent manhole entry 17. The monitoring device 14 is attached to a tow cable 22 which is operationally connected to the windup winch assembly 21 to permit the operator in the van 11 to control the location of the device 14.

Figure 2:
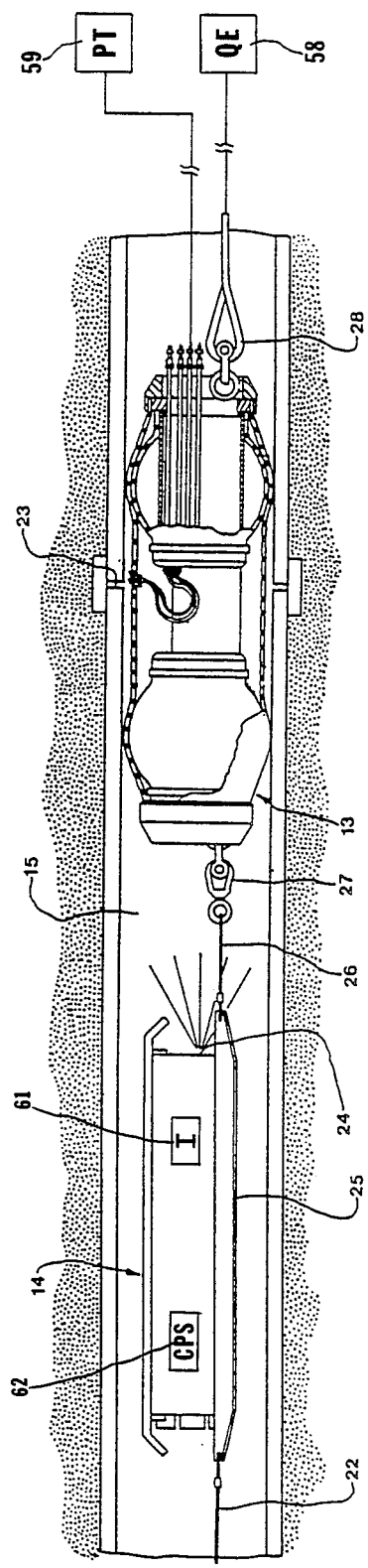
FIG. 2 is a side plan view with cut-away portions which shows the pipeline monitoring device in use with an apparatus for testing and repairing pipeline and positioned for surveying a sewer line joint by the apparatus of the invention.

FIG. 2 illustrates the monitoring device 14 being used in conjunction with an inflatable packer device 13 for testing and/or repairing the pipeline or sewer line 15. The monitoring device 14 is utilized to properly position the inflatable packer device 13 in the sewer line 15 in proximity to a sewer line joint or visible fissure 23 for testing and sealing purposes. The inflatable packer device 13, as further described in U.S. Pat. No. 3,834,422 (Larson), has successfully been used in the pipeline construction and pipeline rehabilitation industries to test pipelines for leakage and to seal the portions where leakage occurs. The functions of the inflatable packer device 13 may be controlled and monitored manually or by an electronic test and seal apparatus (not shown), as further described in U.S. Pat. No. 4,691,728 (Mathison), located in the van 11.

The inflatable packer device 13 is properly positioned at the sewer line joint 23 by the operator by means of the monitoring device 14 which has a sled body 25 and video camera 24. By viewing the position of the packer 13 generated by the camera 24, the operator can maneuver the packer 13 position by means of the physical connections of connecting members 28, 27, 26 and tow cable 22. The monitoring device 14 may also be utilized in the pipeline 15 without the inflatable packer device 13 for surveying purposes only.

Various sensors output information to the control unit 43 relating to the physical parameters of the pipeline 29 and the particular characteristics of the survey being conducted. These sensors include a quadrature encoder (QE) 58, a pressure transducer (PT) 59, an inclinometer (I) 61 and a camera head position sensor (CPS) 62. The quadrature encoder 58 is communicatively connected to the windup winch assembly 21. The pressure transducer 59 is used in conjunction with and is communicatively connected to the inflatable packer device 13. The inclinometer 61 and camera position sensor 62 are communicatively connected to the camera sled assembly 14 as known in the art. Additional sensors may be utilized to collect data on the pipeline 15, for example, means to determine deflection or concentricity of the pipeline; and those mentioned above should be interpreted in the illustrative and not the limited sense.

1. DATA INPUTS AND OUTPUTS OF THE SYSTEM

Figure 3:
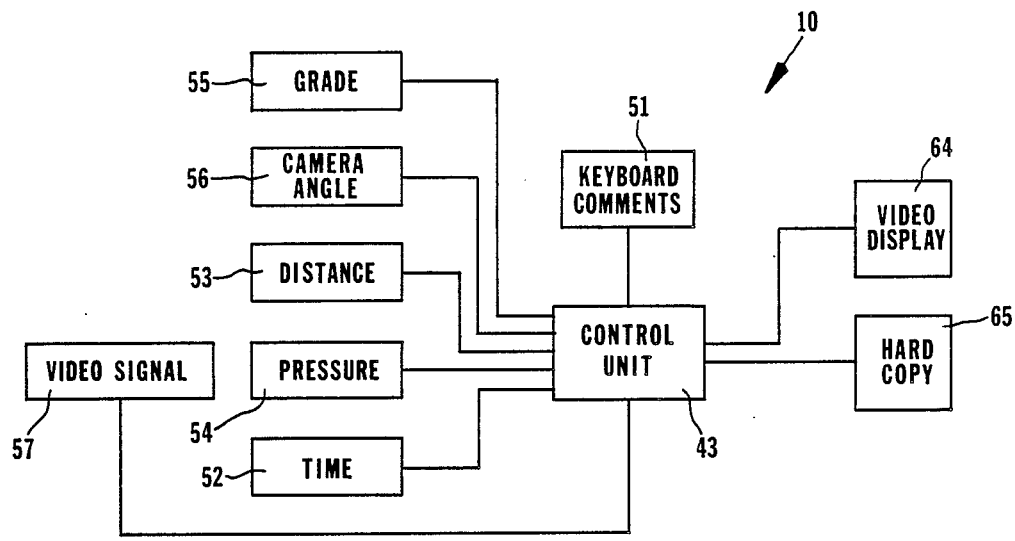
FIG. 3 is a schematic data flow diagram which shows the steps of a method of surveying a pipeline section utilizing the various inputs and outputs of the apparatus of the invention.

FIG. 3 is a data flow diagram showing the various input and output elements of the automatic data collection and display system 10 and their interaction and connection in the process of collecting and displaying data on a pipeline section. The process is monitored and controlled by the operator at the control unit 43.

The automatic data collection and display system 10 has a plurality of data inputs related to the physical parameters of the pipeline being surveyed. The inputs are connected to the control unit 43, which provides a video output 64 and a hard copy output 65. The hard copy output 65 comprises a video tape recording and preferably a printed output or a magnetic disk output. The inputs include operator remarks 51, survey time 52, survey distance 53, pipeline pressure 54, pipeline grade 55, and camera head position 56. In addition, the instantaneous video signal 57 itself is input to the control unit 43.

The main data inputs displayed by the system 10 are survey distance 53, pipeline pressure 54, and survey timing 52. These three inputs are continuously and automatically updated and may be optionally displayed with the video output 64. Operator comments 51 input on a keyboard 63 are also displayed when necessary. Pipeline grade 55 and camera head position 56 may optionally be displayed.

Figure 4:
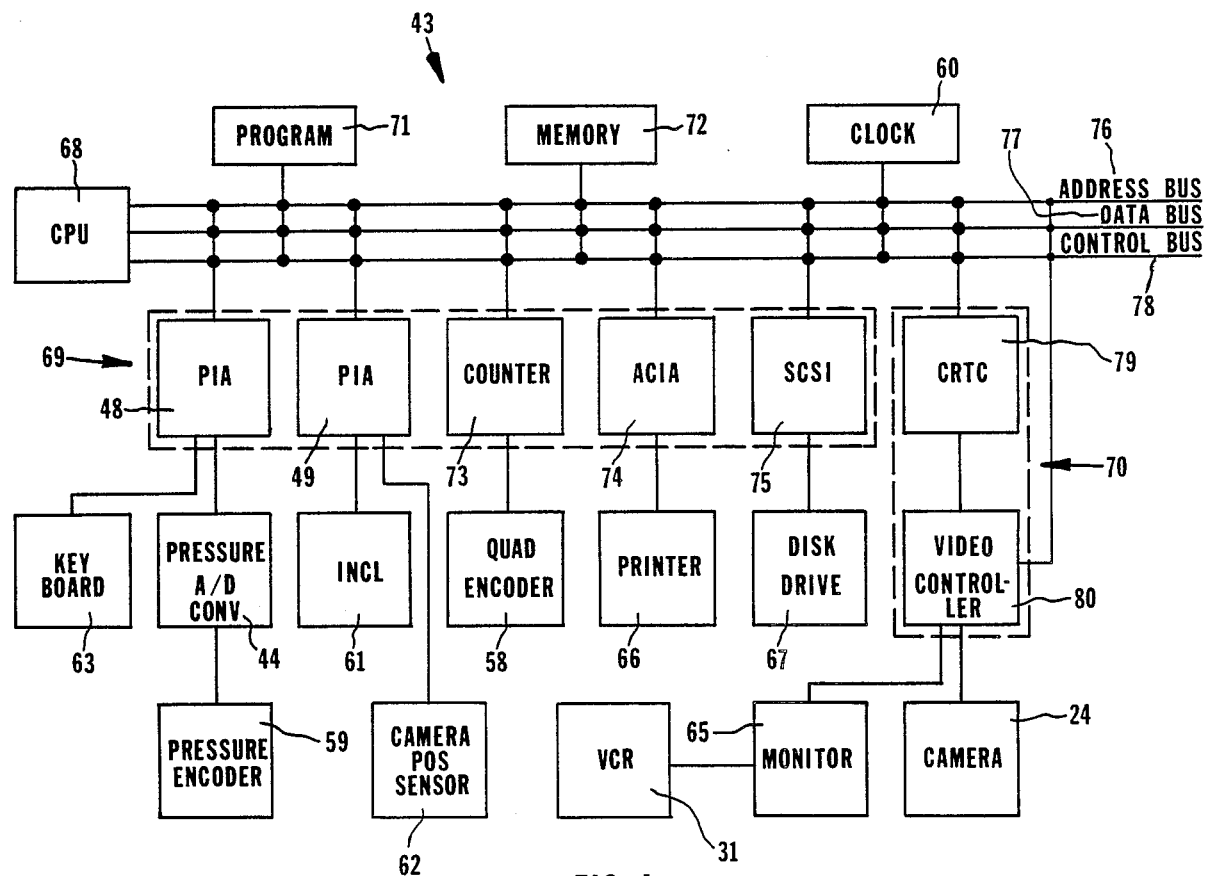
FIG. 4 is a schematic diagram which shows the various hardware elements of the apparatus of the invention.

Referring also to FIG. 4, the various hardware components of the system are shown which acquire or provide the system input and output elements discussed above. The video image or signal 57 is provided to the control unit 43 by the camera 24. The camera preferably provides a color image signal, but it may also be black and white. Survey distance 53 is provided via the quadrature encoder 58. The quadrature encoder 58 is a position sensor which provides a continuous electrical signal related to the magnitude and direction of movement of the camera assembly 14. Survey distance 53 is provided from any preset zero point in 0.1 foot or meter, or any other desired increments. Pipeline pressure 54 is provided by a pressure encoder or transducer 59. The pressure transducer 59 provides an analog signal related to the instantaneous pipeline pressure 54 as determined via the packer 13. This signal is converted to a digital signal by an analog to digital converter 44. Survey time 52 is provided by an internal clock 60 which provides a continuous signal related to the elapsed time for the survey procedure. The inclinometer 61 provides information on the grade or slope of the pipeline 15. The camera position sensor 62 provides information on the angular position of the video camera 24 for accurate indexing of pipeline conditions as observed by the camera 24. The camera position sensor 62 is comprised of a pair of quadrature encoders which provide two axes of movement to determine both the tilt and the angular (polar) rotation of the video camera 24. The camera position sensor 62 is indexed so that a neutral position can be referenced. Additionally, the operator comments are input via the keyboard 63.

The automatic data collection and display system 10 outputs include a video monitor 64 for instantaneous display of the video image and sensor data, a printer 66, and a disk drive 67. The video image is preferably recorded and stored on a magnetic tape via a conventional video recording device 31. Additionally, the system 10 has external output capabilities to input data to complimentary external apparatus such as those having pipeline analysis programs. Data may also be output from the system 10 to a telephone line modem, including mobile telephone systems.

2. CONTROL UNIT - HARDWARE

The control unit 43 of the automatic data collection and display system 10 has three processing systems: a Central Processing Unit or System (CPU) 68, an Input/Output System (I/0 System) 69, and a Graphics Generation and Video Overlay System (Graphics Processor) 70. Embodiments of these three systems are shown in FIGS. 10, 11, 12 and 13 respectively and discussed below. Referring again to FIG. 4, the various inputs from the system 10 are gathered by the I/0 system 69 which interfaces the CPU 68 with the sensors. The inputs are interpreted by the CPU 68 and then manipulated by the graphics processor 70 to format a video output. The CPU 68 is the controller of the system and is communicatively connected to the remaining elements of the system via a system bus comprising: an address bus 76, a data bus 77 and a control bus 78. The CPU 68 accesses program logic 71, memory 72 and the input/output devices. The program 71 controls the operation of the system 10, sequence of events and formats data input from the sensors for output to the graphics processor 70. The memory 72 provides storage of data output from the sensors and preferably comprises a battery-backed RAM or similar non-volatile storage means.

The input/output system 69 has a plurality of adapters which interface the input/output devices with the CPU 68. These adapters include a pair of Peripheral Interface Adapters (PIA) 48 and 49, a Counter 73, an Asynchronous Communciations Interface Adapter (ACIA) 74, and a Small Computer Systems Interface Adapter (SCSI) 75. Additional adapters are useable with the system 10 depending upon the input and output devices provided.

Information sensed by the input devices is routed to the respective adapters of the I/0 system 69 which collect the information for analysis in the CPU 68. The sensed information is latched in the I/0 system 69 and then read into the CPU 68 at its command. The latch and read sequence maximizes CPU 68 processing time eliminating the waiting time delay for device response.

The Peripheral Interface Adapters (PIAs) 48 and 49 provide buffers between the three system buses 76, 77 and 78 which prevent lockup or failure of the entire system 10 upon failure of the input device to which the PIA 48 or 49 is connected. Also, the PIAs 48 and 49 allow the CPU 68 to run continuously without having to stop and transmit or receive information to or from the input/output devices. The PIAs 48 and 49 signal the CPU 68 by setting a flag when information is available from an input source. In time, the CPU 68 recognizes the flag and exchanges the information with the PIA 48 or 49. Conversely, the CPU 68 can flag an input device via the PIA 48 or 49 for the reverse flow of information.

The PIAs 48 and 49 provide bi-directional intermediate storage by allowing information to flow in two directions at two different speeds. The PIAs 48 and 49 operate on a parallel system whereby signals input in the PIA 48 or 49 are output unmanipulated or unchanged. The PIAs 48 and 49 have dual inputs so that the keyboard 63 and pressure encoder 59 are connected to PIA 48, and the inclinometer 61 and camera head position sensor 62 are connected to PIA 49.

The Asynchronous Communications Interface Adapter (ACIA) 74 is a bidirectional, single input system buffer which interfaces the CPU 68 with the printer 66. It is functionally analogous to the PIA 48 and 49 except that it does not operate on the parallel principle. The ACIA 74 manipulates signals so that its output signals differ from the input signals; the ACIA 74 converts ASCII language from one form to another between the CPU 68 and the printer 66. The CPU 68 operates on a parallel format (bytes or words) while the printer 66 operates on a serial format (bits). Thus, the ACIA 74 sends fixed length information from the CPU 68 to the printer 66 by converting parallel to serial. Conversely, the ACIA 74 transmits information from the printer 66 to the CPU 68 by converting serial to parallel. An additional ACIA may be used in place of the PIA 49 for interfacing other types of sensors such as the inclinometer 61 and camera position sensor 62 with the CPU 68.

The Counter 73 is a unidirectional signal adapter which receives signals from the quadrature encoder 58 for transmission to the CPU 68. The quadrature encoder 58 is a non-indexed shaft encoder which provides variable number of serial pulses or counts to the counter 73 for conversion to parallel information, which is usable by the CPU 68. The counter 73 determines the magnitude of movement from the quadrature encoder 58 by generating a count based on such movement. The Counter 73 also determines the direction of such movement by checking the phase relationship of the two signals supplied by the encoder and modifying the parallel information utilizing a count storage which is added to and subtracted from.

The Small Computer Systems Interface adapter (SCSI) 75 is a single input, bi-directional, parallel system buffer which interfaces the CPU 68 with the disk drive 67. It performs a similar adaptive function to that of the PIAs 48 and 49. The SCSI 75 provides rapid flagging of the CPU 68 for fast information exchange to perform, primarily, a handshaking function between the CPU 68 and the disk drive 67. The disk drive 67 utilizes both binary and ASCII information.

The Graphics Processor 70 converts the formatted data generated by the CPU 68 into video graphics for display and overlays the graphics on the video screen 65. The Graphics Processor 70 is comprised of a Cathode Ray Tube Controller (CRTC) 79 and a Video Controller 80. The CRTC 79 receives the data from the CPU 68 and breaks down the data into a CRT raster or screen. The video controller 80 receives video signals from the camera 24, breaks down these signals into a CRT raster, and synchronizes it with the data output of the CRTC 79 for simultaneous display on the monitor 65. The data output of the CRTC 79 may also be displayed by the video controller 88 without a video signal. The video controller 80 of this invention has the capability to display in alternate video formats such as Phase Alternate Line (PAL) and National Television Standards Committee (NTSC) via manual color crystal change or via automatic recognition circuitry.

The CRTC 79 is connected to the system bus for communication with the CPU 68. The video controller 80 is communicatively connected to the CRTC 79, the camera 24 and the monitor 65. The video controller 80 receives signals from the camera 24 and sends signals to the monitor 65. Communication between the video controller 80 and the CRTC 79 is bi-directional.

The formatted sensor data signals from the CPU 68 are received by the CRTC 79 and stored in the screen memory. The stored signals are then broken down by the CRTC 79 into a picture and finally transmitted to the video controller 80 in response to clock signals (described below) from the CPU 68.

The video controller 80 preferably has five phase locked loops. The phase locked loops provide a means of effectively interlocking system blocks for synchronous running. The video controller 80 supplies the system or master clock to the CPU 68. The masterclock synchronizes the display of data on the video screen 65. Synchronization may be externally generated via the camera 24, where there is a video signal input to the video controller 80, or internally generated by the video controller 80 where no video signal is input. The video controller 80 thus senses whether a video signal is present and switches to either external or internal synchronization. If a video signal is generated by the camera 24, the clock locks or synchronizes the camera 24 image with the data output from the CRTC 79. The video controller 80 also synchronizes color signals from the camera 24 with the color signal from the CRTC 79. Finally, the video controller 80 multiplexes the camera 24 signal with the CRTC 79 signal and outputs the multiplexed signal to the monitor 65 for display. The phase locked loops additionally provide horizontal and vertical synchronization pulses and a color carrier signal during internal operation.

FIGS. 10-13 show particular embodiments of the control unit 43 circuitry. The circuit elements as shown may be disposed on separate printed circuit cards arranged in an insertable and layered configuration to provide a compact structure for location in a rackmountable housing frame or cabinet. The cabinet has a removable front panel for quick removal of the printed circuit cards and ease of servicing. The printed circuit cards are preferably of a type having injector/ejectors capable of locking the printed circuit cards in place. Additionally, the keyboard 63 may be integrated with the cabinet to provide a unitary structure for rack mounting. The keyboard 63 is preferably a dome-type switch keyboard having a plurality of discreet tactile feel switches, a microprocessor and a weather resistant mylar cover. The grouping of circuit elements shown provides a convenient and efficient interconnection, although other arrangements are possible in conformance with the invention. These circuit elements are primarily and preferably comprised of integrated circuits. In FIGS. 10-13, the left side of each circuit configuration communicates with the system bus and has leads which are coded for correspondence with the circuit configurations shown in the other drawing figures.

Figure 10:
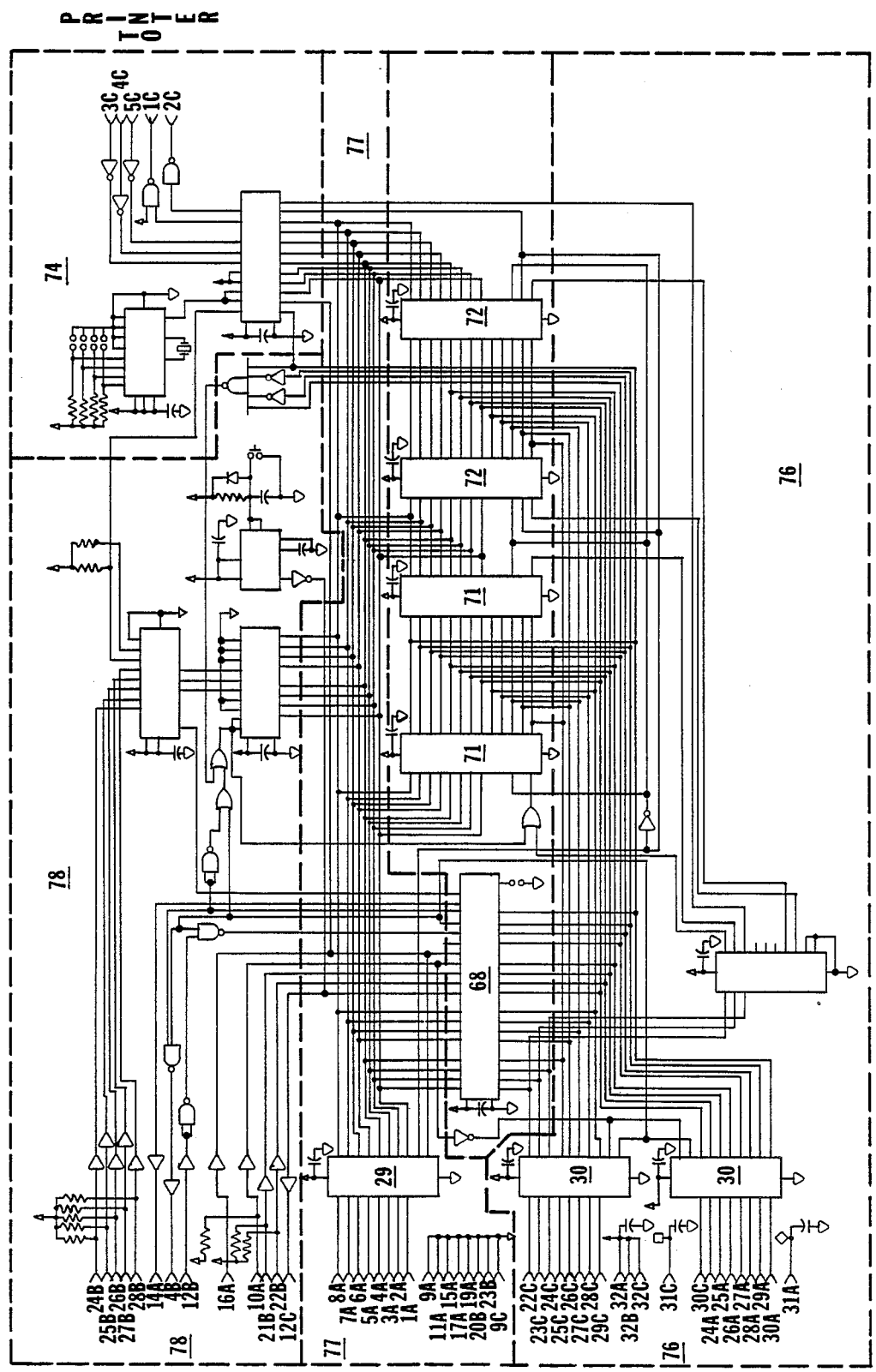
FIG. 10 is a schematic circuit diagram generally showing the central processing unit of the apparatus of the invention.

FIG. 10 shows a circuit arrangement with the CPU 68 connected to the control bus 78, data bus 77 and address bus 76. The buses 76, 77 and 78 provide communicative connection between the circuit components for transmission of information signals. Line drivers 29 and 30 are interposed in the data bus 77 and address bus 76 respectively to connect the remaining circuit components arranged on additional circuit boards. The line drivers 29 and 30 also isolate the circuit configurations to provide improved location of component failure in the event of an electrical malfunction. FIG. 10 shows the interconnection of the program 71, memory 72 and ACIA 74 to the CPU 68.

Figure 11:
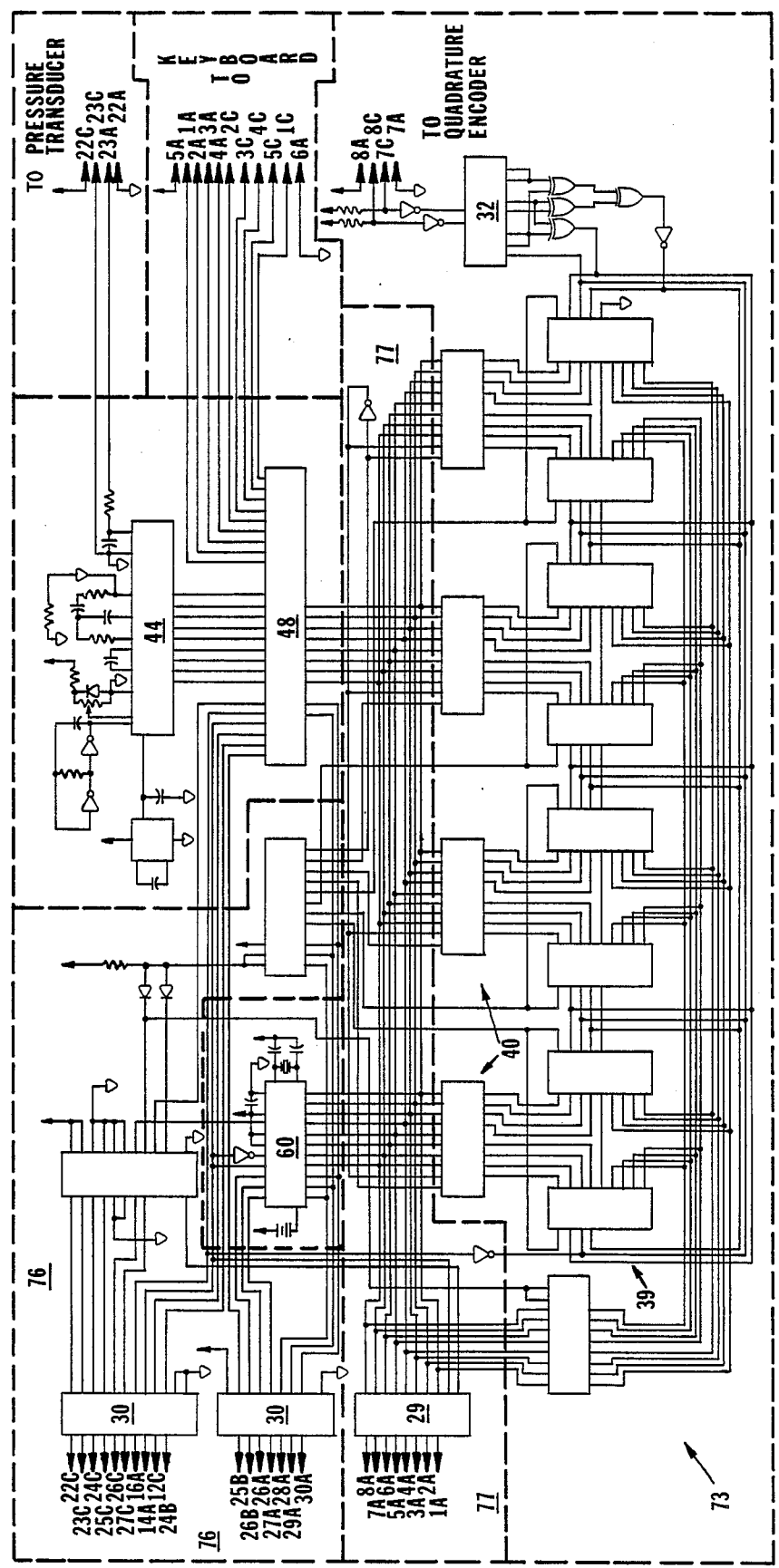
FIG. 11 is a schematic circuit diagram generally showing the input/output section of the apparatus of the invention.

FIG. 11 shows the interconnection of the counter 73 and PIA 48 to the data bus 77 and address bus 76. An address bus line driver 30 is interposed in the address bus 76. The pressure analog to digital converter 44 is connected to the PIA 48. Additionally, an encoder interface 32 is connected to the counter 73. The encoder interface 32 is connected to a pair of outputs from the quadrature encoder 58. The encoder interface 32 determines the direction of rotation of the encoder 58 shaft and supplies a count. The Counter 73 is a binary ripple counter comprised of a ripple chain 39 and a plurality of storage registers 40.

Figure 12:
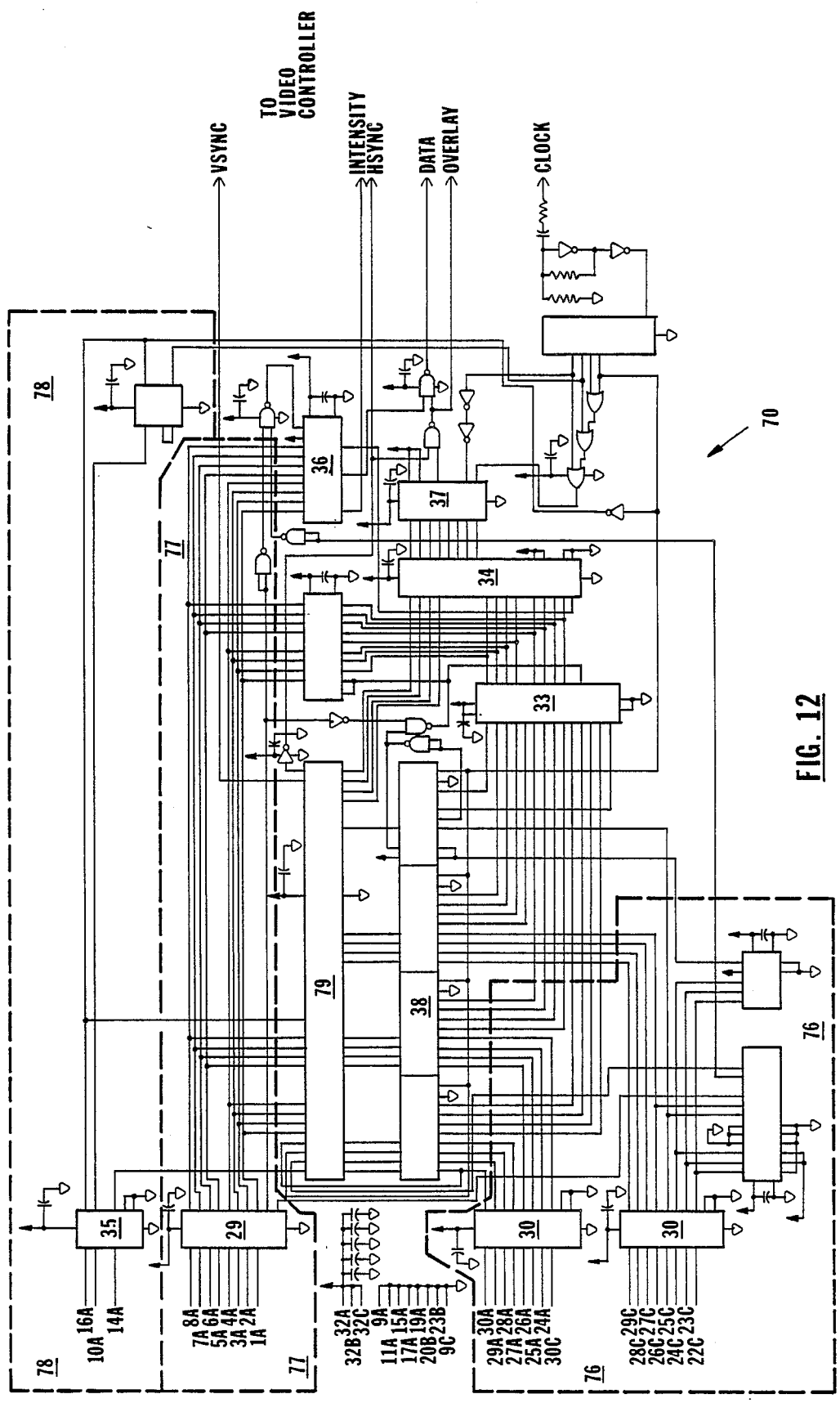
FIG. 12 is a schematic circuit diagram generally showing the graphics generation section of the apparatus of the invention.
Figure 13:
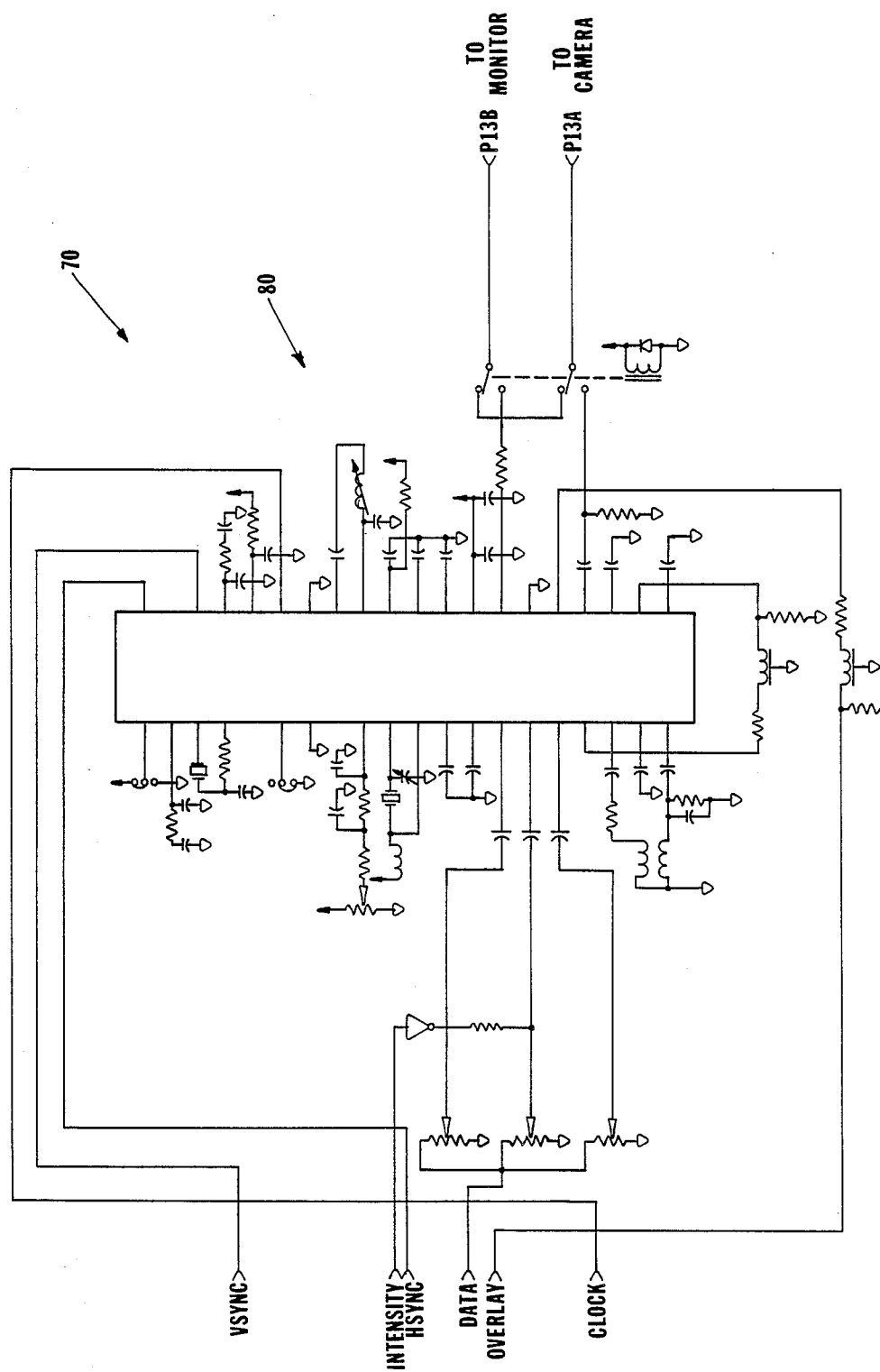
FIG. 13 is a schematic circuit diagram generally showing the video overlay section of the apparatus of the invention.

FIG. 12 shows the interconnection of the graphics processor 70 with the data bus 77, the address bus 76 and the control bus 78. The control bus 78 also has a control bus line driver 35. The graphics processor 70 is comprised of the CRTC 79 and an interleaf control 38. A character memory 33, a character ROM 34, an attribute controller 36 and a serializer 37 are communicatively connected to the CRTC 79. Primarily, these components generate graphics based on data signals from the input sensors. FIG. 13 shows an embodiment of the video controller 80 of the graphics processor 70. Primarily, the video controller 80 overlays the graphics with the video image.

3. CONTROL UNIT - PROGRAM

Referring also to FIG. 5, the program 71 controls the process or method of the system 10. The program 71 first receives signals output from the sensors via the I/0 system 69 and updates the data storage 72. This is accomplished by an update routine 45. Second, the program 71 utilizes a display routine 46 to display the collected information in a graphical format on the video screen 65. Thirdly, the program 71 utilizes a check keyboard routine 47 to collect information inputted by the operator on the keyboard 63. The program 71 then recycles to the first step 45 for data update. This three-part cycle occurs at a rate of not less than 1 time per second, for example, preferably at a rate of 6 times per second, utilizing the circuit embodiments shown herein.

Prior to the running of the routines 45, 46 and 47 and upon activation of the system 10, the program 71 initializes the system 10 to set up the CPU 68 and the various input and output peripherals. The program 71 then formats and displays a series of information screens, preferably but not limited to two, which the operator uses to input general information pertaining to the survey. For example, the date, location and other survey information may be recorded. As a final initialization step, the program 71 inputs a starting distance for the survey.

The system 10 provides program 71 update capabilities via linkage of the CPU 68 to an external device such as a disk drive or microcomputer. Additionally, language interchange may be made via program 71 changes or by changing the character generator. Further, the program 71 comprises replaceable memory chips which provide for ease of programming and display changes.

a. Update Routine

The update routine 45 of the program 71 is executed by the central processing unit 68 and converts computer information code such as binary, hexadecimal, decimal, and binary coded decimal to American Standard Code for Information Interchange (ASCII) which is displayable on the screen 65. The update routine 45 conversion is operative on output signals from the various input adapters. The update routine 45 converts, consecutively, binary count information from the Counter 73 to update survey distance, binary coded decimal (BCD) information from the PIA 48 to update pipeline pressure, BCD information from the PIA 49 to update pipeline grade, binary information from the PIA 49 to update camera position, and BCD information from the clock 60 to update survey time. The order of update steps is not limited to that shown and may be alternated. Upon completing the update from each adapter, the update routine 45 switches to the display routine 46.

b. Display Routine

Referring to FIG. 6, the automatic data collection and display system 10 provides graphical indications of survey data input to the various sensors on the video screen 65. The display routine 46 processes information from the update routine 45 to format this graphical indication. The display routine 46, which is latched while the update routine 45 is being run in the CPU 68, first determines which information is to be displayed graphically. The display routine 46 checks to see if and what data is to be displayed. If data is to be displayed, the display routine 46 next determines with what graphic attribute or characteristic it is to be displayed via a sequential line-by-line check of video flags. The information is then output to the graphics processor 70 for display on the respective display lines of the screen 65 in a page format. After the display routine 46 is complete, or if no information is to be displayed, the check keyboard routine 47 is executed.

As previously discussed, information processed by the display routine 46 is routed from the CPU 68 to the graphics processor 70 which formats the ASCII alpanumeric information and combines it with the pipeline video image from the camera 24. The graphics processor 70 activates the particular pixels or dots on the video screen 65 to display the alphanumeric information in accordance with the display routine 46 and coordinates the graphics display with the pipeline video image to produce an overlay. The graphics processor 70 generates graphics on both a bit-by-bit and line-by-line sequence while the video overlay function is accomplished on a line-by-line sequence.

c. Check Keyboard Routine

Figure 7:
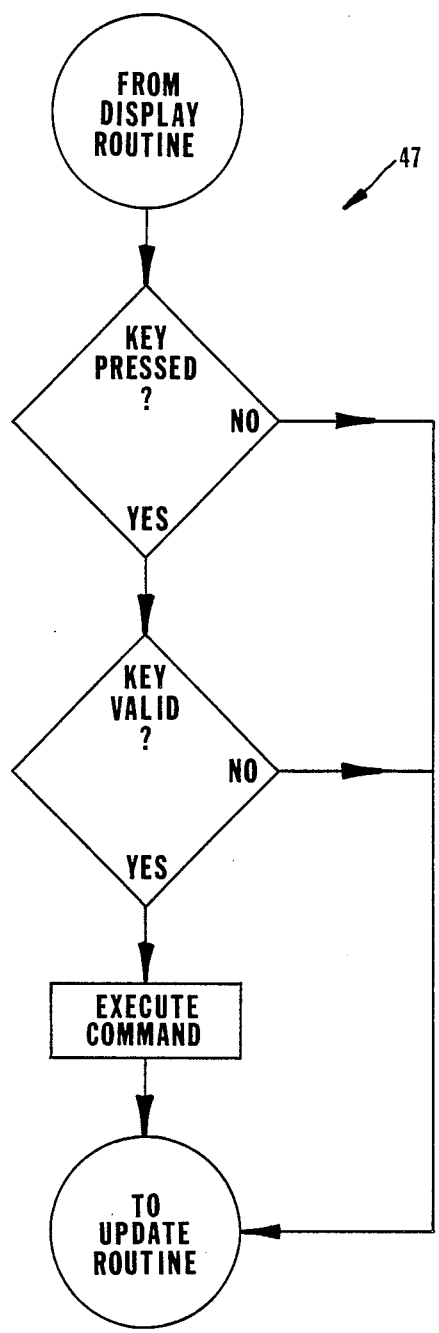
FIG. 7 is a schematic flow diagram which illustrates the check keyboard routine process of the invention.

The check keyboard routine 47 of the program 71 provides, via a plurality of command subroutines, for input of operator remarks pertaining to the survey and for adjustment of the display characteristics of the graphical data. Referring to FIG. 7, the check keyboard routine 47 first determines whether any key on the keyboard 67 has been depressed. If not, the program 71 returns to the update routine 45. If, however, a key has been depressed, the keyboard routine 47 verifies the correspondence between the key depressed and the executable subroutines. The validation check confirms whether the numeric or alphanumeric key sequence entered by the operator is valid and operable. In the event of an invalid entry, the program 71 returns to the update routines 45. If a valid numeric key is pressed, the routine 47 displays a preprogrammed operator comment corresponding to that numeric key. The preprogrammed operator comments comprise a quick menu of commonly encountered pipeline conditions and defects, for example, cracking, the presence of debris, leaking, misalignments, obstructions, off grade portions, protruding laterals, roots, misaligned joints and the like. If the valid key depressed on the keyboard 63 is alphanumeric, the routine 47 executes a display function subroutine corresponding to that key. The display functions adjust graphical display characteristics such as character size, intensity, position and the like on the monitor 65. Subsequently, the program 71 returns to the update routine 45.

4. CONTROL UNIT - SYSTEM OPERATION VIA THE KEYBOARD

The system 10, when activated, initially and via the program 71 steps discussed above, inquires of the operator whether it is to start a new survey or whether it is to resume a survey already in progress. The system 10 then inquires as to initial footage reading, time, date, and the like. Also, several display lines on the screen 65 are available for preliminary operator remarks. The survey then commences and, as the camera assembly 14 progresses through the length of pipeline, survey distance, time and pipeline pressure are continuously updated and displayed on the monitor 65 with the video image of the pipeline by the above-described process. Also as previously described, operator remarks are input and overlayed with the video image via the numeric menu keys. Finally, the command functions allow the operator to control the particular display characteristics or aspects of the overlayed data via access by the non-numeric keys.

The system 10 provides ten (10) lines on the screen 65 for graphical display of data in a page format. Preferably, updated footage is displayed on line 1, updated pressure is displayed on line Z, and updated time is displayed on line 3. Line 4 is dedicated for the display of operator quick remarks from the menu. Lines 5-10 are available for additional functions or remarks. However, the system 10 can provide any number of lines and each can be dedicated to any additional data display such as concentricity measurement and the like.

Figure 8:
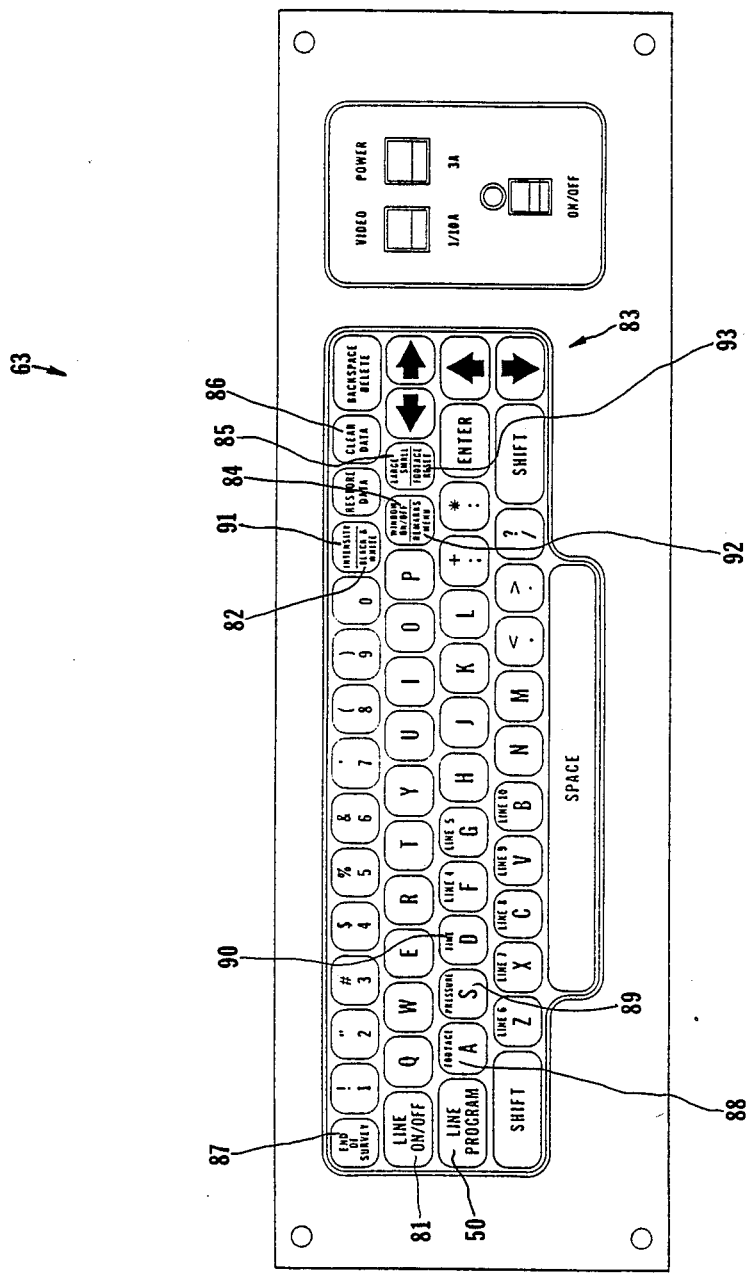
FIG. 8 is a frontal view of the keyboard of the apparatus of the invention.

The command functions provide adjustments for alphanumeric data character size, intensity, position and the like. Referring to FIG. 8, the keyboard 63 has a line on/off function 81. This function 81 can be used to engage or disengage any display line of the 10 line screen 65. A line program function 50 is used to provide operator comments which are not available on the pre-programmed menu. The line program function 50 may be activated with respect to any of lines 5-10 to enter any comment thereon.

The system 10 has a black/white function 82 which allows the operator to change the alphanumeric type to black or white to contrast the type with the video imagebackground. This system 10 may also be manufactured to display in color. Four-directional cursor movement functions 83 allow the operator to control the movement of data on the screen 65. The system 10 further has a window on/off function 84 which allows the operator to contrast a block of the screen 65 containing the alphanumeric data with the remainder of the screen 65. The system 10 has a large/small function 85 which allows the operator to change the size of the alphanumeric symbols printed on the screen 65. The system 10 also has an intensity function 91 which controls the brightness of the graphics.

The system 10 has a clear-data function 86 which allows the operator to either switch on or off data appearing on the screen 65 while retaining such data in the central processing unit 68. This feature allows the operator to shut off on-screen graphics while they remain within the central processor 68.

Footage 88, and time 90 functions are provided with a means for the operator to initialize this data manually. These functions when activated in conjunction with the line on/off function 81, provide a means of terminating the automatic updating and display of such data. The system has a menu remarks function 92 which displays the entire menu for operator viewing and selection. Additionally, a footage reset function 93 provides a means of establishing a preset survey point.

Finally, an end-of-survey function 87 allows the operator to terminate surveying of a particular segment of pipeline. Subsequent to the end-of-survey, the system 10 provides an on-screen menu of commands for additional survey alternatives. The central processor 68 retains the last provided physical parameters at the time the system 10 is disengaged so that the operator can recall these parameters upon resuming surveying at a later time. The system thus provides a data back-up to retain survey information in the event of accidental power interruption and the like.

FIG. 9 shows a printout format 94 of information on a pipeline survey conducted using the automatic data collection and display system 10 of this invention. The printout 94 provides a preset title block which indicates information on the surveying entity such as the name, address, and telephone number. The printout 94 indicates the date, customer location, operator identification, and inspector identification. The printout 94 also provides the street name, pipe size and type, and joint type. The printout 94 further indicates upstream and downstream manhole number and condition, as well as the survey measurement parameters. Finally, the printout 94 provides a tabulated data on survey distance, pipeline pressure, and survey time corresponding to operator remarks.

In summary, this invention provides a method for automatically collecting and graphically displaying and recording data from an input source and information from an observer at a remote location on the physical parameters of a pipeline with a video image of the pipeline. The method involves, first, providing a continuous video image of the pipeline. Continuous data on the physical parameters of the pipeline is then detected and converted to a graphical format. The graphics are then overlayed on the video image. Finally, graphical information from an observer is provided and overlayed on the video image, whereby the data and the operator generated information are continuously updated on the video image.

As many changes are possible to the embodiments of this invention utilizing the teachings thereof, the descriptions above, and the accompanying drawings should be interpreted in the illustrative and not the limited sense.

That which is claimed is:

1. An automatic data collection and display system for use with a video pipeline inspection apparatus having a video camera which provides a video signal, continuous data input devices for receiving information on physical operating parameters of the video camera, and a remote video monitor which displays the video signal, said system comprising:
   a. operator input means;
   b. processing means and displaying data from the data input devices and from said operator input means on the video monitor, said processing means being communicatively connected to the video pipeline inspection apparatus and to said operator input means; and
   c. means, communicatively connected to said processing means, to overlay data collected from the data input devices and from said operator input means in a graphic format on the video signal displayed on the video monitor.

2. The automatic data collection and display system of claim 1, wherein said operator input means in a weather resistant, tactile feel switch keyboard.

3. The automatic data collection and display system of claim 1, wherein the data input devices includes timing means, an odometer, and a pressure determination means.

4. The automatic data collection and display system of claim 1, wherein said processing means comprises input/output control means connected to the data input devices for collecting signals from the data input devices, and a central processor communicatively connected to said input/output control means, said processing means and said means to overlay data received from the data input devices and from said operator input means in a graphic format on the video signal further comprising insertable an removable printed circuit cards.

5. The automatic data collection and display system of claim 4, wherein said input/output control means comprises a plurality of adapters constructed and arranged to interface the data input devices with said central processor.

6. The automatic data collection and display system of claim 4, wherein said processing means utilizes Computer Information Code and has program means for converting signals from the data input devices and from said operator input means into said graphic format for display.

7. The automatic data collection and display system of claim 6, wherein said program means for converting signals from the data input devices and from said operator input means into said graphic format comprises, consecutively, an update routine, a display routine, and a check-keyboard routine.

8. The automatic data collection and display system of claim 7, wherein said update routine converts data input device data output to said central processor from Computer Information Code to American Standard Code for Information Exchange.

9. The automatic data collection and display system of claim 8, wherein said display routine determines whether data input device data has been updated for display, determines the display format of the data input device data, and then displays the data input device data on the video monitor.

10. The automatic data collection and display system of claim 7, wherein said check-keyboard routine comprises a plurality of subroutines being accessible via said operator input means, said check-keyboard routine first determining whether said access has been made, whether said access is valid and then executing said subroutine.

11. The automatic data collection and display system of claim 10, wherein said subroutines include a preprogrammed menu of operator input remarks and a plurality of information display functions.

12. The automatic data collection and display system of claim 11, wherein said pre-programmed menu comprises a plurality of statements which are descriptive of common pipeline conditions and defects.

13. The automatic data collection and display system of claim 11, wherein said information display functions comprise means for adjusting the physical characteristics of the data input device data and said operator input remarks displayed on the video monitor.

14. The automatic data collection and display system of claim 1, wherein said means to overlay data converts signals from the data input devices to page format graphics and overlays said page format graphics on the video signal from the video camera for display on the video monitor.

15. The automatic data collection and display system of claim 14, wherein said means to overlay data comprises a graphics generation processor and a video overlay processor.

16. The automatic data collection and display system of claim 15, wherein the video camera and remote video monitor are a color camera and monitor respectively, and wherein said video overlay processor synchronizes color signals from the camera with color signals from color graphics from the graphics generation processor, said video overlay processor further having means to alternate video formats.

17. The automatic data collection and display system of claim 1, further comprising means to produce a hard copy of the video signal and said graphic format data received from the data input devices and from said operator input means, said hard copy including a video recording.

18. An automatic, data collection and display system for use with a pipeline video surveying device including a video camera which provides a video image of physical operating parameters, said system comprising:
  a. a plurality of continuous data input means connected to the surveying device for receiving information on the physical operating parameters of the surveying device;
  b. operator input means;
  c. data output means including a video monitor and a video recorder; and
  d. a control unit communicatively connected to the surveying device, to said data input means, to said operator input means and to said data output means, said control unit having interconnected processing means collecting and displaying data from said data input means on said video monitor, input/output control means interfacing said data input means, said operator input means, and said data output means with said processing means, and means to overlay data collected from said data input means and said operator input means graphically on the video image.

19. An automatic, electronic system for remote data collection and display and for use in a pipeline, said system comprising:
  a. a mobile, color video camera assembly providing a video image;
  b. a plurality of continuous data input means for receiving information on physical operating parameters of said video camera assembly;
  c. operator input means;
  d. data output means including a video monitor and a video recorder; and
  e. a control unit constructed and arranged for correlating information from said data input means and said operator input means with said video image, said control unit having:
    i. processing means controlling collection and display of data from said data input means, said processing means having program means for updating information from said data input means, for displaying said updated information, and for correlating information from said operator input means therewith,
    ii. input/output control means interfacing said data input means, said operator input means and said data output means, with said processing means, and
    iii. means to overlay graphical data on a video image, said means to overlay having electronic means for generating graphics from data signals from said data input means and from said operator input means, and electronic means for overlaying said graphics with signals from said video camera for display on said video monitor, whereby data from said data input means and from said operator input means is continuously updated and displayed on said video monitor.

20. A method for automatically collecting and graphically displaying continuous data from an input source and information from an observer on the physical parameters of a pipeline with a video image of the pipeline, comprising the steps of:

a. providing a continuous video image of the pipeline;
b. detecting data on the pipeline physical parameters;
c. receiving data generated by an observer relating to said video image;
d. converting said detected and said received data to a graphical format; and
e. overlaying said graphical format data on said video image, whereby said detected data and said received data are continuously updated and displayed on said video image.

* * * * *